May 27, 1930.  J. R. BISHOP  1,760,577
BAND SAW GUIDE
Filed Oct. 26, 1927
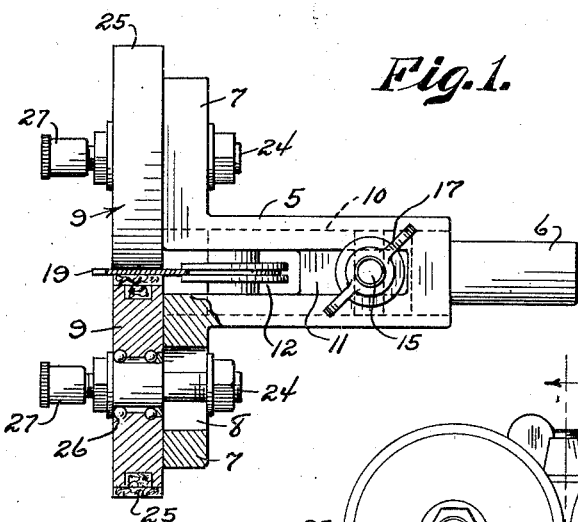
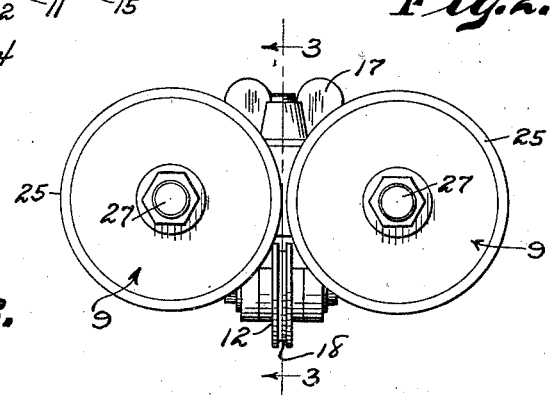
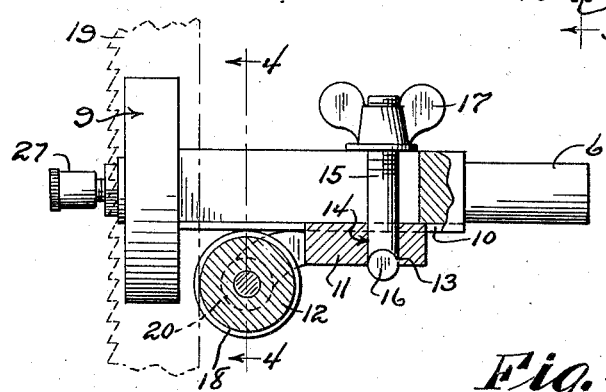
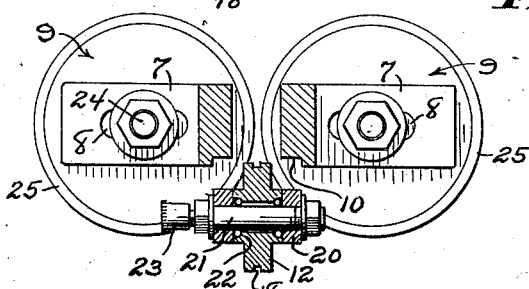
John Randolph Bishop
INVENTOR
BY Victor J. Evans
ATTORNEY
WITNESS:

Patented May 27, 1930

1,760,577

UNITED STATES PATENT OFFICE

JOHN RANDOLPH BISHOP, OF CHARLOTTESVILLE, VIRGINIA

BAND-SAW GUIDE

Application filed October 26, 1927. Serial No. 228,934.

The invention relates to guides for saws particularly band saws and serves not only to guide the saw with respect to transverse movement but also to guide the back of the saw and keep the same from riding out of the rollers.

The main object is the provision of adjustable means for guiding band saws so that the one device will take care of saws of different thicknesses and the provision of a means for fastening the guide to the frame of the saw.

A further object is to provide the guiding rollers coming into contact with the face of the saw with leather faces so that the said rollers will not wear the saw and to provide these rollers and the back roller with bearings and lubricating means for the said bearings to give a longer life to the guide.

A still further object is to provide the back roller with a securing means which will be sure to keep the roller from canting which would give a twist to the saw and probably break it.

The invention is illustrated in the accompanying drawing, in which:

Figure 1 is a top plan view showing part in section.

Figure 2 is an end view.

Figure 3 is a sectional view on the line 3—3 of Figure 2.

Figure 4 is a sectional view on the line 4—4 of Figure 3.

The invention comprises a U-shaped frame 5 having a projection 6 formed at the bottom of the U, the outer ends of the frame being bent outward to form flanges 7. The flanges have slots 8 therein and are primarily for supporting the guide rollers 9. The U-shaped frame has its arms formed with recesses on their underside to provide a track 10, which carries the sliding support 11 of the back roller 12. The sliding support of the roller 12 has a transverse groove 13 communicating midway its ends with a hole 14 in the support adapted to receive a securing bolt 15. The bolt is T-shaped and has its head 16 fitting in the groove 13, with its body portion or shank passing thru the hole 14 of the support and between the arms of the U-shaped frame for slidable movement and is secured in adjusted position by a wing nut 17 that rests on the upper surfaces of the arms. The wheel 12 is formed with a groove 18 which is adapted to receive the back of the saw blade 19. This roller 12 is arranged between downwardly curved ears 20 on the sliding support and is journaled on an axle bolt 21, thereby allowing the wheel to be removed and replaced with another having a different size groove. The roller 12 is provided with bearings 22 and a means is also provided for lubricating the bearings such as the grease cup 23. The rollers 9 are removably fastened to the frame by the bolts 24 and are adjustable in the slots 8 of the flanges. These rollers are provided with a leather face 25 which engages the sides of the saw and like the back roller have bearings 26 and a grease cup 27 for lubrication.

The guide frame is fastened by means of the projection 6 to the saw mechanism in a desired position by any means. The leather covered guide rollers are adjusted to fit the thickness of the saw and a back roller with a suitably sized groove set in place. The said back roller is secured in a desired position, the T-shaped bolt holding it in place.

The invention describes a guide which would practically fit any size band saw and one which would give efficient service, all the parts being capable of replacement independent of any other part thereby giving a guide which would be cheaper to use.

What is claimed is:—

A guide for a band saw comprising a substantially U-shaped frame having recesses formed in the underside of the arms thereof to provide a track, outwardly extending opposed flanges formed on the ends of the arms, leather faced journaled guide rollers adjustably mounted on the flanges for movement with respect to each other, a support having a groove on its underside and a hole communicating with the groove intermediate its ends, a T-shaped bolt having its head arranged in the groove and its shank passing through the hole, downwardly curved ears formed on the support, a circumferentially grooved guide roller journaled between the ears, said support being arranged for movement on the track with the shank of the bolt passing between the arms for slidable movement and in a manner whereby the grooved guide roller is adjustable with respect to the first mentioned guide rollers, a wing nut threadedly secured to the shank and being engageable with the upper side of the arms for retaining the grooved roller in adjusted positions and an attaching projection formed with the U-shaped frame.

In testimony whereof I affix my signature.

JOHN RANDOLPH BISHOP.